(12) United States Patent
Jeon et al.

(10) Patent No.: US 11,557,809 B2
(45) Date of Patent: Jan. 17, 2023

(54) BATTERY PACK

(71) Applicant: SAMSUNG SDI CO., LTD., Yongin-si (KR)

(72) Inventors: Duseong Jeon, Yongin-si (KR); Soomin Ahn, Yongin-si (KR); Jeehoon Jeon, Yongin-si (KR); Dongsik Kwak, Yongin-si (KR); Wunseok Jeong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 132 days.

(21) Appl. No.: 17/132,322

(22) Filed: Dec. 23, 2020

(65) Prior Publication Data

US 2021/0203032 A1 Jul. 1, 2021

(30) Foreign Application Priority Data

Dec. 31, 2019 (KR) .......................... 10-2019-0179790

(51) Int. Cl.
*H01M 50/244* (2021.01)
*H01M 50/249* (2021.01)
(Continued)

(52) U.S. Cl.
CPC ....... *H01M 50/244* (2021.01); *H01M 50/209* (2021.01); *H01M 50/249* (2021.01);
(Continued)

(58) Field of Classification Search
CPC ............. H01M 50/244; H01M 50/209; H01M 50/249; H01M 50/296; H01M 50/507; H01M 2220/20; H01M 50/503; H01M 50/517; H01M 50/238; H01M 50/55; H01M 50/242; H01M 50/271; H01M 50/298;
(Continued)

(56) References Cited

U.S. PATENT DOCUMENTS 8,771,862 B2 7/2014 Kim et al.
9,859,544 B2 1/2018 Park et al.
(Continued)

FOREIGN PATENT DOCUMENTS

CN 104466072 A 3/2015
CN 206313019 U 7/2017
(Continued)

OTHER PUBLICATIONS

European Search Report dated May 11, 2021.
Chinese Office action dated Sep. 16, 2022.

*Primary Examiner* — Michael L Dignan
(74) *Attorney, Agent, or Firm* — Lee IP Law, P.C.

(57) ABSTRACT

A battery pack including a plurality of battery cells arranged along a first direction; a holder, the holder including terminal holes exposing terminals of the battery cells, and pairs of first plates separated from each other between adjacent terminal holes and pairs of elastic pieces that are bent from the pairs of first plates in opposite directions along the first direction; and bus bars, each of the bus bars including coupling portions at opposite sides thereof and coupled to adjacent terminal holes, and a central bent portion connecting the coupling portions and extending around corresponding pairs of elastic pieces to surround the corresponding pairs of elastic pieces.

20 Claims, 8 Drawing Sheets

(51) Int. Cl.
    *H01M 50/296* (2021.01)
    *H01M 50/209* (2021.01)
    *H01M 50/507* (2021.01)

(52) U.S. Cl.
    CPC ....... *H01M 50/296* (2021.01); *H01M 50/507* (2021.01); *H01M 2220/20* (2013.01)

(58) Field of Classification Search
    CPC .. H01M 50/502; H01M 50/20; H01M 50/572; Y02E 60/10
    See application file for complete search history.

(56) References Cited

U.S. PATENT DOCUMENTS

| | | | |
|---|---|---|---|
| 9,929,391 B2 | 3/2018 | Nakamura et al. | |
| 2011/0287299 A1 | 11/2011 | Kim | |
| 2012/0121966 A1* | 5/2012 | Kim | H01M 50/553 |
| | | | 429/158 |
| 2015/0079447 A1* | 3/2015 | Park | H01M 50/503 |
| | | | 429/121 |
| 2015/0171405 A1* | 6/2015 | Lee | H01M 10/058 |
| | | | 29/857 |
| 2017/0244091 A1* | 8/2017 | Yuasa | H01M 50/502 |
| 2017/0288183 A1* | 10/2017 | Sakai | H01M 50/209 |
| 2018/0034021 A1* | 2/2018 | Yamamoto | H01M 10/613 |
| 2018/0076429 A1* | 3/2018 | Shoji | H01M 50/209 |
| 2018/0076491 A1* | 3/2018 | Shoji | H01M 50/209 |
| 2019/0181508 A1* | 6/2019 | Kim | H01M 10/48 |

FOREIGN PATENT DOCUMENTS

| | | | | |
|---|---|---|---|---|
| JP | 2012-164477 | * | 8/2012 | ............. H01M 2/20 |
| JP | 2012-164477 A | | 8/2012 | |
| JP | 2012-182043 A | | 9/2012 | |
| JP | 5644523 B2 | | 11/2014 | |
| JP | 2014-232633 | * | 12/2014 | ............. H01M 2/20 |
| JP | 2014-232633 A | | 12/2014 | |
| JP | 6365186 B2 | | 7/2018 | |
| KR | 10-1146677 B1 | | 5/2012 | |
| KR | 10-1201747 B1 | | 11/2012 | |
| KR | 2017-0001766 | * | 5/2017 | ............. H01M 2/10 |
| KR | 2018-0022480 | * | 3/2018 | .......... H01M 50/502 |

* cited by examiner

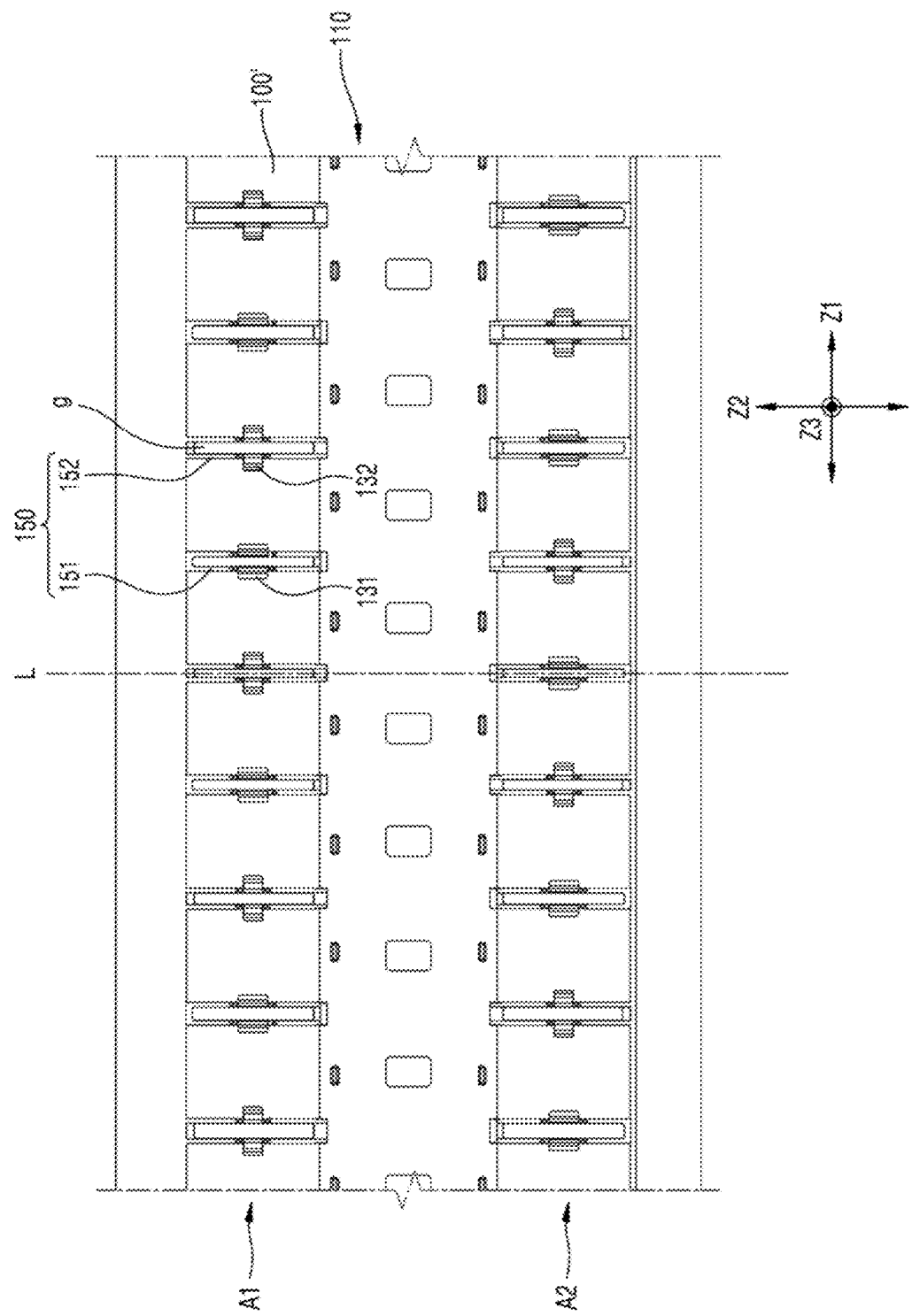

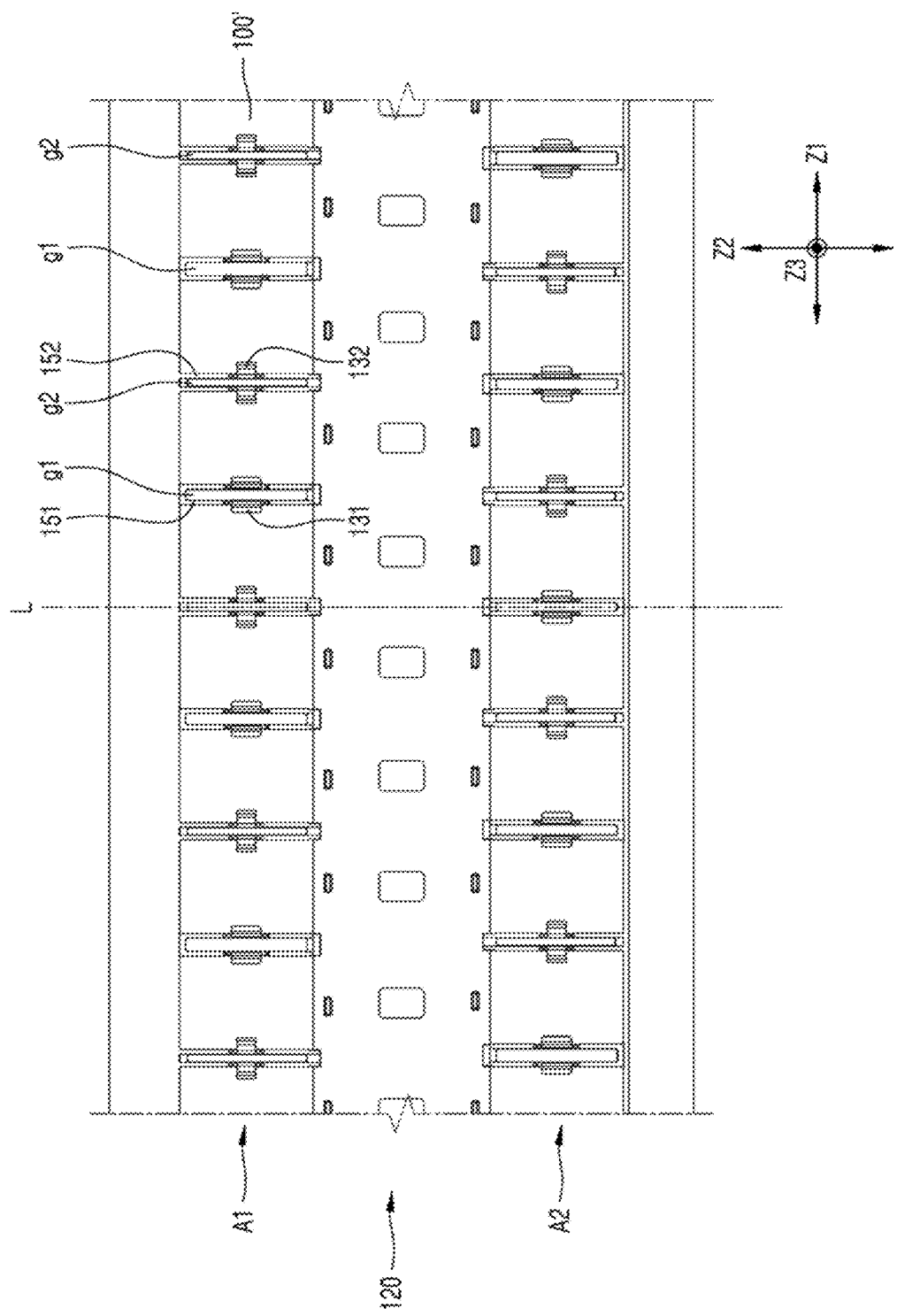

BATTERY PACK

CROSS-REFERENCE TO RELATED APPLICATION

Korean Patent Application No. 10-2019-0179790, filed on Dec. 31, 2019, in the Korean Intellectual Property Office, and entitled: "Battery Pack," is incorporated by reference herein in its entirety.

BACKGROUND

1. Field

Embodiments relate to a battery pack.

2. Description of Related Art

Generally, secondary batteries are chargeable and dischargeable unlike primary batteries, which are not rechargeable. Secondary batteries may be used as energy sources for, e.g., mobile devices, electric vehicles, hybrid electric vehicles, electric bicycles, uninterruptible power supply devices, etc., and may be used in the form of a single battery or in the form of a battery module in which a plurality of batteries are electrically connected and packed as a single unit, according to the type of an external device in which the secondary batteries are to be used.

Small-sized devices such as mobile phones may operate for a specific amount of time by using power and a capacity of a single battery, but for devices requiring long-time driving and high-power driving such as electric vehicles and hybrid electric vehicles consuming large amounts of power, a module form including a plurality of batteries may be in light of power and capacity, and an output voltage or an output current may be raised according to the number of batteries accommodated therein.

SUMMARY

The embodiments may be realized by providing a battery pack including a plurality of battery cells arranged along a first direction; a holder, the holder including terminal holes exposing terminals of the battery cells, and pairs of first plates separated from each other between adjacent terminal holes and pairs of elastic pieces that are bent from the pairs of first plates in opposite directions along the first direction; and bus bars, each of the bus bars including coupling portions at opposite sides thereof and coupled to adjacent terminal holes, and a central bent portion connecting the coupling portions and extending around corresponding pairs of elastic pieces to surround the corresponding pairs of elastic pieces.

The pairs of elastic pieces may be bent to face the bent portion of a corresponding bus bar along the first direction.

The pairs of elastic pieces may have a rounded curved shape.

The pairs of elastic pieces may each include a first elastic piece bent toward one side of the bent portion of a corresponding bus bar along the first direction, and a second elastic piece bent in a direction opposite to the first elastic piece and toward another side of the bent portion of the corresponding bus bar.

The pairs of elastic pieces may be at center positions of the pairs of first plates in a widthwise direction of the pairs of first plates, the widthwise direction of the pairs of first plates being a second direction intersecting with the first direction.

The pairs of first plates may each include a first center portion from which the pairs of elastic pieces extend and first side portions on opposite sides of the first center portion, in a widthwise direction of the pairs of first plates, the widthwise direction of the pairs of first plates being a second direction intersecting with the first direction, and a height of the first center portion may be less than a height of each first side portion.

The pairs of first plates may each include a cutting groove between the pairs of elastic pieces and the first side portions.

The battery pack may further include pairs of second plates between adjacent terminal holes and arranged in an alternating order with the pairs of first plates, wherein the pairs of first plates have a first gap therebetween in the first direction, and the pairs of second plates have a second gap therebetween in the first direction.

The pairs of first plates may have a height that is different from a height of the pairs of second plates, as measured in a vertical third direction that intersects with the first direction.

The battery pack may further include pairs of assembly pieces on the pairs of second plates, wherein the pairs of elastic pieces are on the pairs of first plates.

The pairs of elastic pieces may be on the pairs of first plates in positions that are opposite to a first gap between the pairs of first plates, and the pairs of assembly pieces may be on the pairs of second plates in positions that are opposite to a second gap between the second plates.

The pairs of elastic pieces may face a bent portion of a same bus bar, and the pairs of assembly pieces may face coupling portions of different bus bars.

The pairs of elastic pieces may face the bent portion of a corresponding bus bar along the first direction, and the pairs of assembly pieces may face the coupling portions of corresponding bus bars in a vertical third direction that intersects with the first direction.

The pairs of assembly pieces may extend from the pairs of second plates in opposite directions along the first direction and are bent in a vertical third direction that intersects with the first direction to face the coupling portions of corresponding bus bars.

The pairs of assembly pieces may be at center positions of the pairs of second plates in a widthwise direction of the pairs of second plates, the widthwise direction of the pairs of second plates being a second direction intersecting with the first direction.

The pairs of second plates may each include a second center portion from which the pairs of assembly pieces extend and second side portions on opposite sides of the second center portion, in a widthwise direction of the second plates, the widthwise direction of the pairs of second plates being a second direction intersecting with the first direction, and a height of the second center portion may be less than a height of each of the second side portions.

The pairs of second plates may include a cutting groove between the pairs of assembly pieces and the second side portion.

Sizes of the first gaps and the second gaps may vary according to a relative position thereof along the first direction.

Sizes of the first gaps and the second gaps may increase with increasing distance from a center position of the holder to an edge position of the holder along the first direction.

Sizes of the first gaps may vary according to a relative position thereof along the first direction, and sizes of the second gaps may be constant.

BRIEF DESCRIPTION OF THE DRAWINGS

Features will be apparent to those of skill in the art by describing in detail exemplary embodiments with reference to the attached drawings in which:

FIG. 7 shows a modified embodiment of a holder of FIG. 2, showing a modified structure of a plate; and FIG. 8 shows another modified embodiment of the holder of FIG. 2, showing another modified structure of a plate.

DETAILED DESCRIPTION

Figure 1:
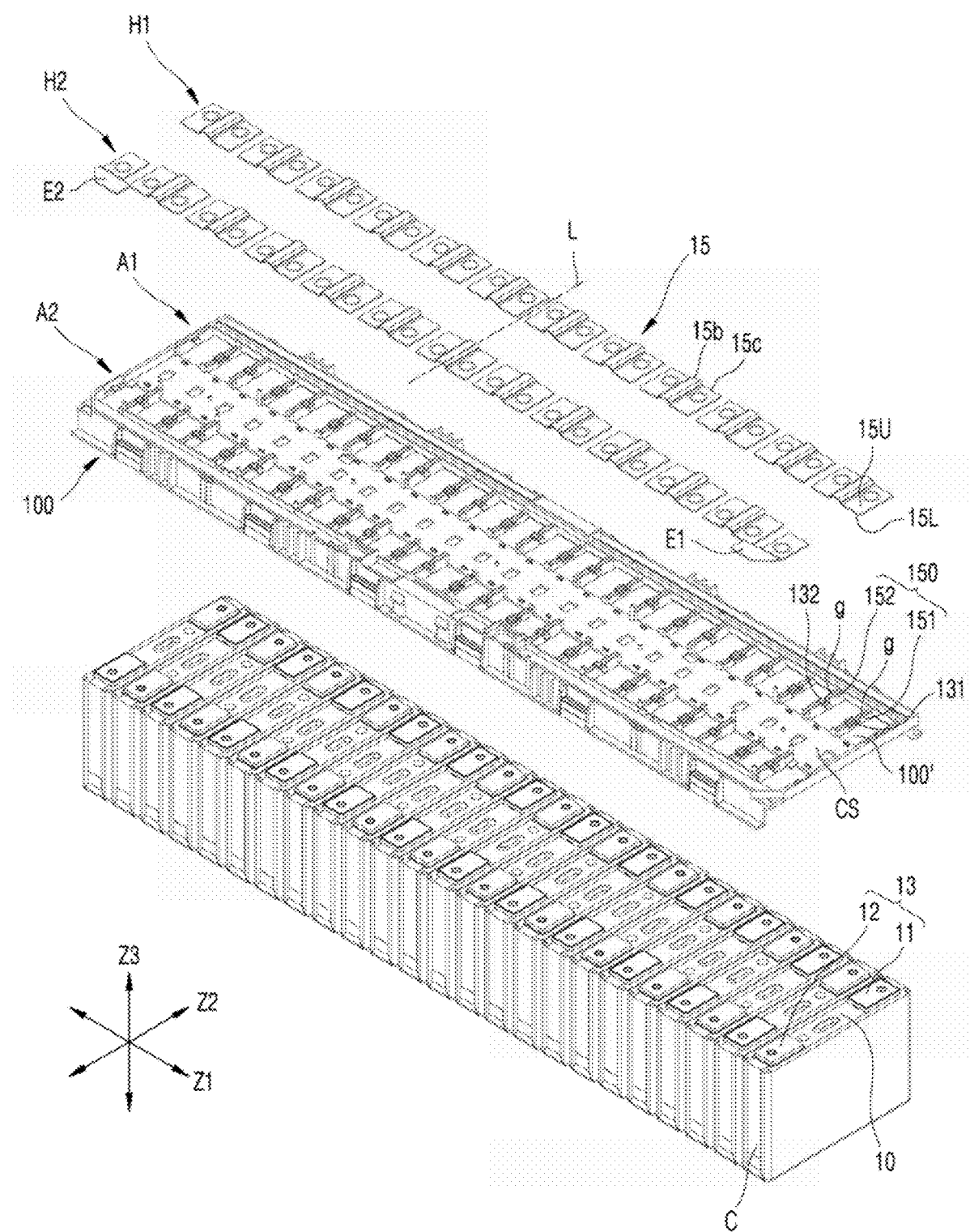
FIG. 1 is an exploded perspective view of a battery pack according to one or more embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," when preceding a list of elements, modify the entire list of elements and do not modify the individual elements of the list.

Hereinafter, a battery pack according to embodiments will be described with reference to the accompanying drawings.

Figure 2:
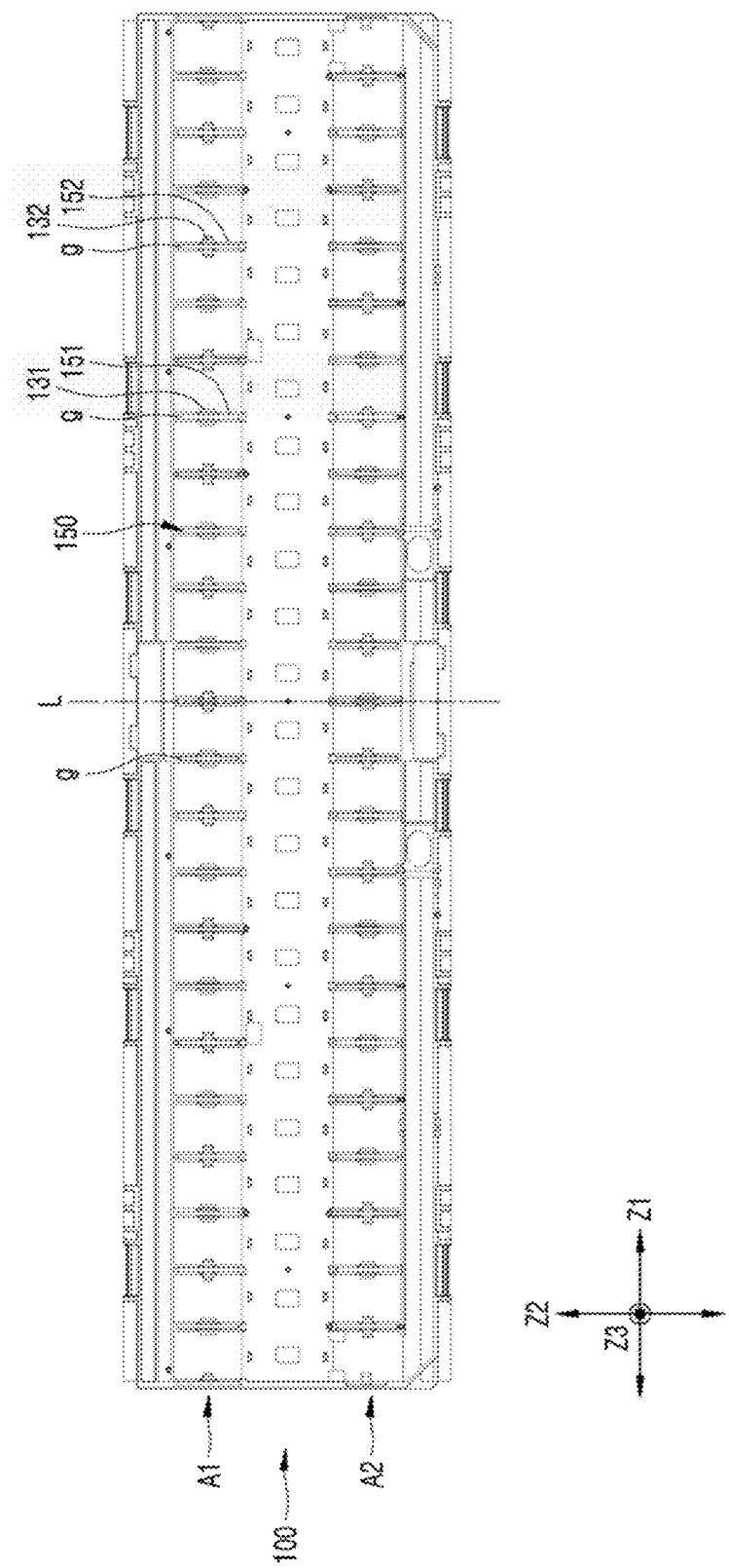
FIG. 2 shows an arrangement of a terminal hole and a plate of a holder shown in FIG. 1.
Figure 3:
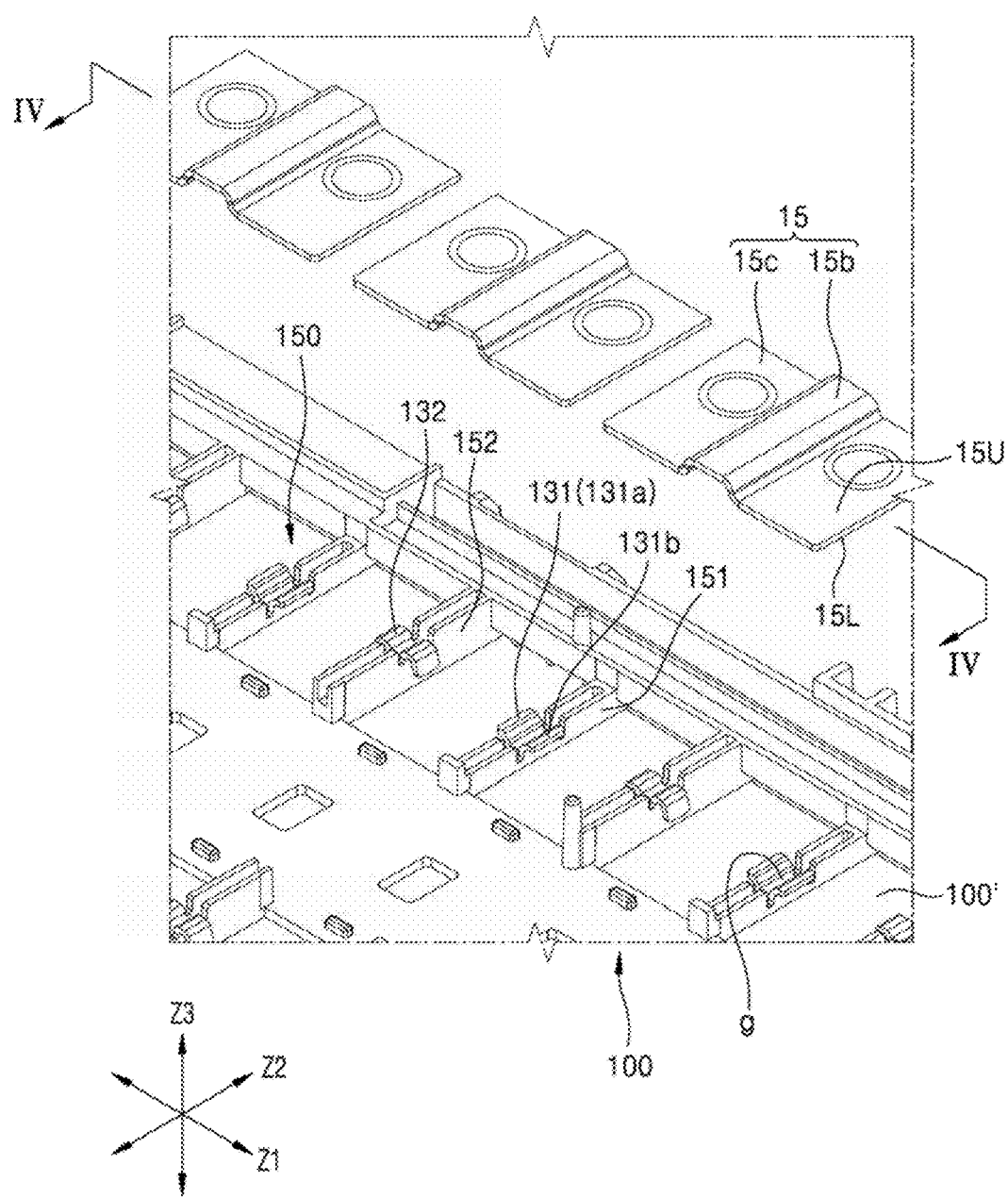
FIG. 3 is a perspective view showing a support structure of a bus bar shown in FIG. 1.
Figure 4:
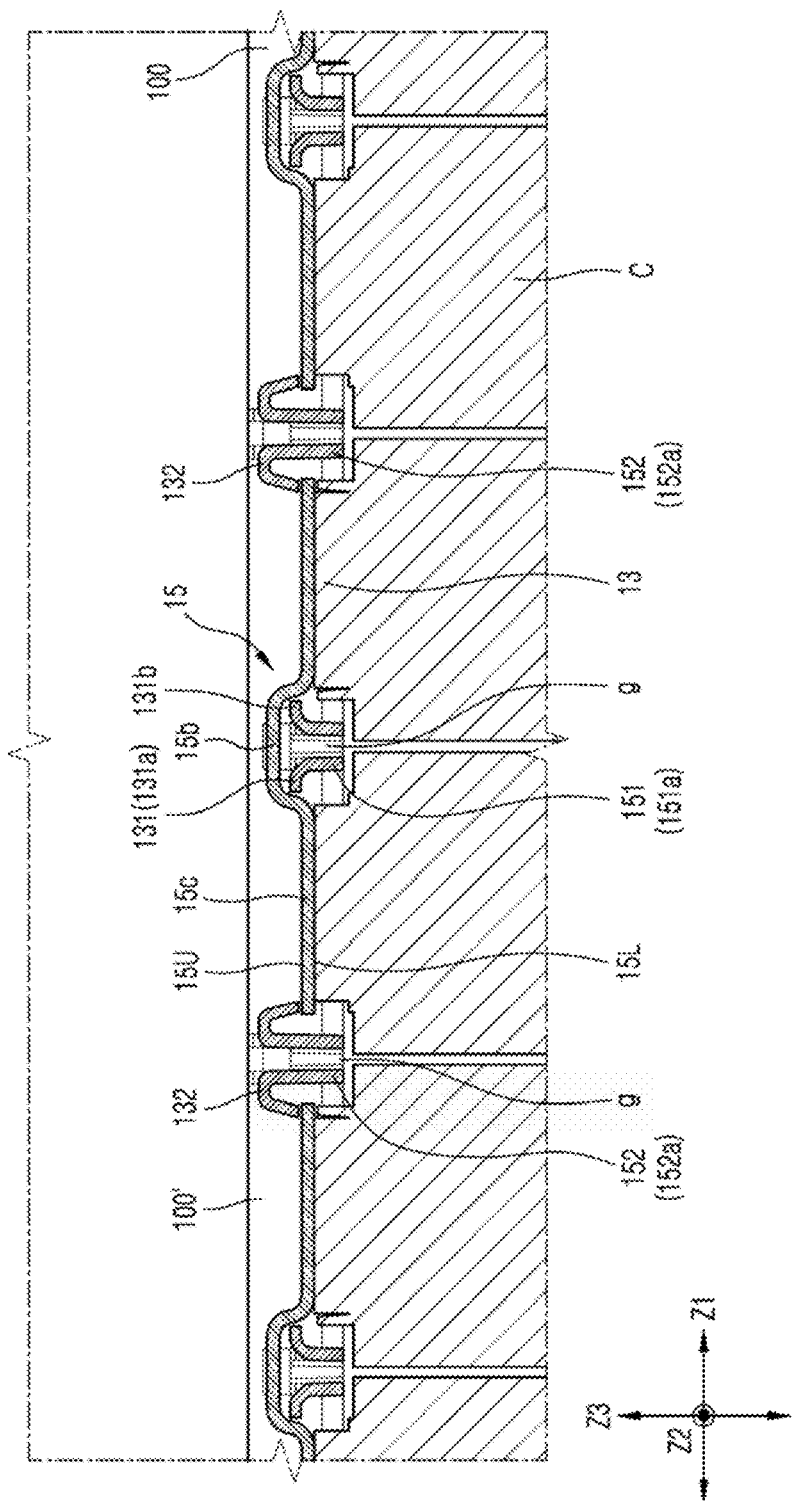
FIG. 4 is a cross-sectional view taken along a line IV-IV of FIG. 3.
Figure 5:
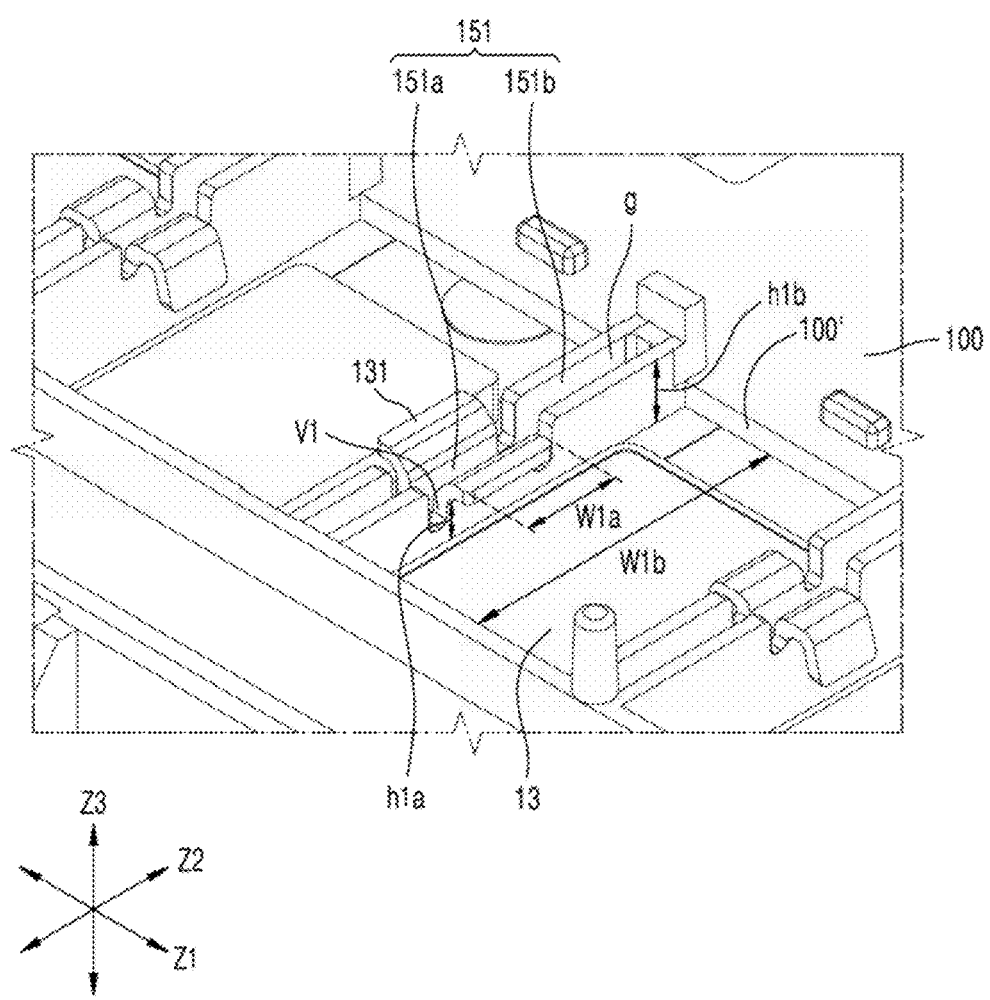
FIGS. 5 and 6 are perspective views showing structures of an elastic piece and an assembly piece of FIG. 1, respectively.
Figure 6:
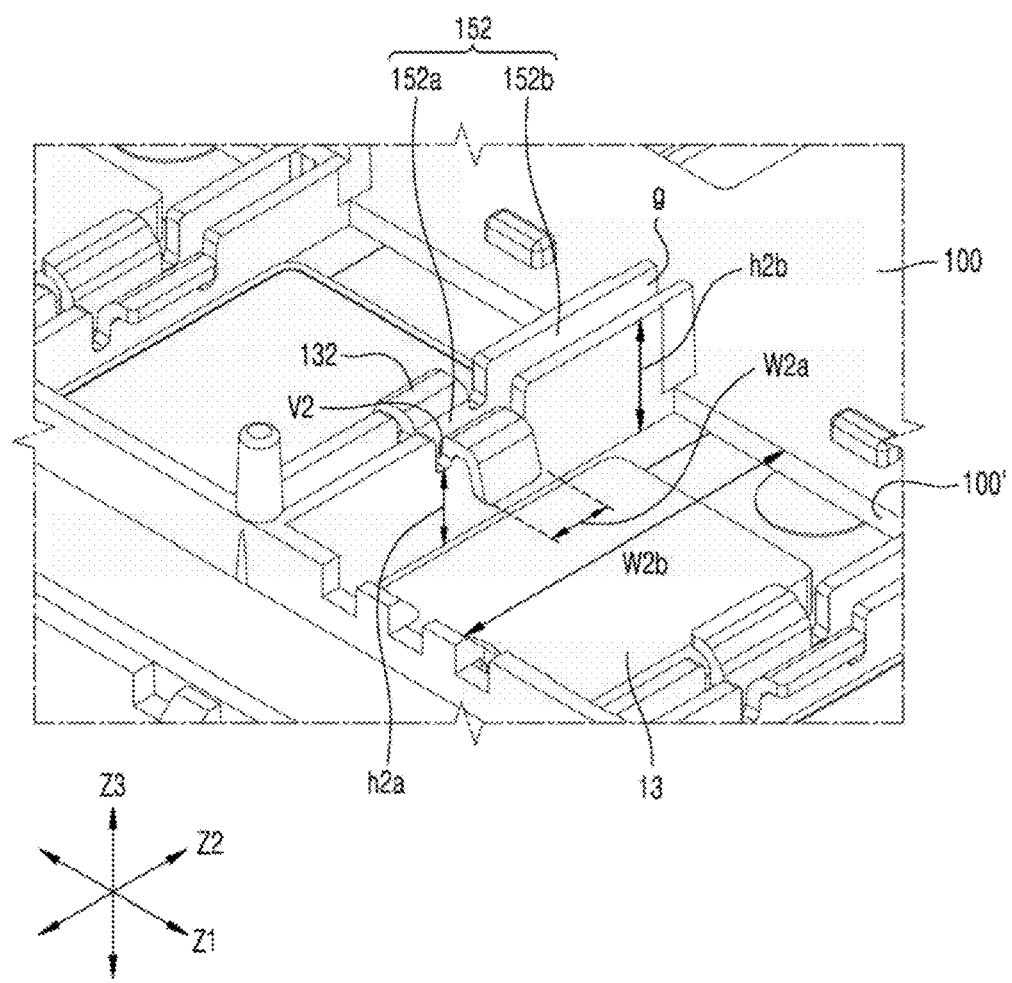

FIG. 1 is an exploded perspective view of a battery pack according to one or more embodiments. FIG. 2 shows an arrangement of a terminal hole and a plate of a holder of FIG. 1. FIG. 3 is a perspective view showing a support structure of a bus bar shown in FIG. 1. FIG. 4 is a cross-sectional view taken along a line IV-IV of FIG. 3. FIGS. 5 and 6 are perspective views showing structures of an elastic piece and an assembly piece of FIG. 1, respectively.

Referring to FIGS. 1 and 2, the battery pack may include a plurality of battery cells C, bus bars 15 that electrically connect the plurality of battery cells C, and a holder 100 between the battery cells C and the bus bars 15.

The battery cells C may be arranged along a first axis Z1 (e.g., along a first direction Z1). The battery cells C may each include a terminal surface 10 facing the bus bars 15, and a terminal 13 on the terminal surface 10 may include a first terminal 11 and a second terminal 12 that are on opposite sides in a widthwise direction (e.g., a second direction Z2) of the battery cell C.

The holder 100 may be between the bus bars 15 and the battery cells C, and a circuit board (electrically connected with the bus bar 15) may be on the holder 100. The holder 100 may provide insulation between the bus bar 15 and the battery cells C and insulation between the circuit board and the battery cells C, may provide an assembly position of the bus bars 15 and the circuit board, and may support the bus bar 15 and the circuit board.

The holder 100 may include first and second arrangements A1 and A2 of terminal holes 100', on opposite sides relative to the widthwise (e.g., second direction Z2) of the battery cells C, and a circuit settlement portion CS between the first and second arrangements A1 and A2 of the terminal holes 100'. In an implementation, the terminal holes 100' may include the terminal holes 100' in the first arrangement A1 and the second arrangement A2 on opposite sides relative to the widthwise (e.g., second direction Z2) of the battery cells C. The circuit settlement portion CS (e.g., on which the circuit board settles or is accommodated) may be between the terminal holes 100' of the first arrangement A1 and the second arrangement A2. The terminal holes 100' of the first arrangement A1 and the second arrangement A2 may be arranged (e.g., spaced apart) along the first direction Z1 in which the battery cells C are arranged, and may expose terminals 13 of the battery cells C arranged along the first direction Z1. The terminal 13 of one battery cell C exposed through one terminal hole 100' may be electrically connected with the terminal 13 of another battery cell C, while being coupled with the bus bars 15. The bus bars 15 may be arranged along the first direction Z1 in such a way to be assembled to the terminal holes 100' arranged along the first direction Z1, and may include bus bars 15 in first and second arrangements H1 and H2 to be assembled to the terminal holes 100' of the first and second arrangements A1 and A2. The bus bars 15 may electrically connect the terminals 13 of different battery cells C, and in this sense, output terminals E1 and E2 at opposite ends of the bus bars 15 of the second arrangement H2 may not correspond to the bus bars 15. The output terminals E1 and E2 may form an electric contact between the plurality of battery cells electrically connected to each other and an external circuit such as a load or a charger.

Hereinbelow, a description will be focused on the terminal holes 100' of the first arrangement A1 and the bus bars 15 of the first arrangement H1 assembled to the terminal holes 100' of the first arrangement A1. However, technical matters of the terminal holes 100' of the first arrangement A1, the bus bars 15 of the first arrangement H1, and peripheral components thereof may be equally applied to the terminal holes 100' of the second arrangement A2, the bus bars 15 of the second arrangement H2, and peripheral components thereof.

The terminal holes 100' of the first arrangement A1 may include a plurality of terminal holes 100' arranged (e.g., spaced apart) along the first direction Z1. The terminal 13 of each battery cell C may be exposed through the terminal holes 100', such that as many terminal holes 100' as the battery cells C may be formed, and the number of terminal holes 100' of the first arrangement A1 and the number of battery cells C along the first direction Z1 may be equal to each other.

Referring to FIGS. 3 and 4, the bus bars 15 (for electrically connecting adjacent battery cells C) may be assembled or coupled to the terminal holes 100'. As the bus bars 15 are assembled to adjacent terminal holes 100', the bus bars 15 may couple the terminals 13 of the adjacent battery cells C exposed through the adjacent terminal holes 100' to each other. In an implementation, one bus bar 15 may be assembled to all adjacent terminal holes 100'. As will be described below, the bus bars 15 may each include coupling portions 15c on opposite sides thereof, assembled to the adjacent terminal holes 100'.

Between the adjacent terminal holes 100' along the first direction Z1, a pair of plates 150 may be arranged separated from each other with a gap g therebetween. The plates 150 may be provided in pairs with the gap g therebetween. The gap g between the plates 150 may provide a clearance for absorbing positional movement of the bus bars 15 accompanied by an assembly error of the bus bars 15 along the first direction Z1 or swelling of the battery cell C. In an implementation, the plates 150 may be in pairs to form the gap g while being separated from each other along the first direction Z1, or may allow positional movement accompanied by the assembly error of the bus bars 15 along the first direction Z1 or swelling of the battery cell C. In an implementation, the plates 150 may bend to allow positional movement of the bus bars 15, absorb positional movement of the bus bars 15 through the gap between the plates 150, or may help prevent stress delivery (due to positional movement of the bus bars 15) from spreading along the first direction Z1.

In an implementation, the plates 150 may extend lengthwise in the shape of a flat plate along the widthwise direction thereof, e.g., second direction Z2, which intersects with the first direction Z1. As described below, an elastic piece 131 or an assembly piece 132 may be alternately formed in or on the plates 150 depending on a position along the first direction Z1, in which the plates 150 may provide a support base for the elastic piece 131 or the assembly piece 132 and may extend in the shape of a flat plate to provide a stable support base. The plates 150 may bend to allow positional movement of the bus bars 15 along the first direction Z1, while absorbing positional movement of the bus bars 15 through the gap g between the plates 150. In an implementation, positional movement of the bus bars 15 caused by the assembly error of the bus bars 15 along the first direction Z1 or swelling of the battery cell C may be allowed mainly by the elastic piece 131 that forms physical interference ahead of the plate 150 that may be formed in the shape of a flat plate that is favorable in terms of rigidity maintenance, rather than in the shape of a curved surface that is favorable in terms of bending to stably support the elastic piece 131.

The plate 150 may include a first plate 151 and a second plate 152 that are alternately arranged along the first direction Z1. In an implementation, the plate 150 may be between all adjacent terminal holes 100' along the first direction Z1, and the first plate 151 and the second plate 152 may be in an alternating order along the first direction Z1. In an implementation, the first plate 151 and the second plate 152 may each be in pairs with the gap g therebetween, and may extend in the shape of a flat plate along the widthwise second direction Z2 of the plate 150. To be described below, the elastic piece 131 and the assembly piece 132 having different structures may be on the first plate 151 and the second plate 152, respectively, and the first plate 151 and the second plate 152 may be distinguished from each other by the elastic piece 131 and the assembly piece 132 that are on the first plate 151 and the second plate 152, respectively. As described below, the elastic piece 131 and the assembly piece 132 on the first plate 151 and the second plate 152, respectively, may face or be adjacent to different portions of the bus bars 15, and a different elastic piece 131 and a different assembly piece 132 may be on the first plate 151 and the second plate 152, respectively, to face the different portions of the bus bars 15, depending on positions of the first plate 151 and the second plate 152. Additional details of the elastic piece 131 and the assembly piece 132 will be described below.

The first plate 151 and the second plate 152 may be formed in a globally similar shape while extending in the shape of a flat plate along the second direction Z2. In an implementation, the first plate 151 and the second plate 152 may have different heights (see FIGS. 5 and 6). In an implementation, the first plate 151 (having the elastic piece 131) may be shorter (e.g., in a vertical third direction Z3) than the second plate 152 (having the assembly piece 132). Such a structure may allow for the bus bar 15 to settle on the terminal 13 of the battery cell C exposed through the terminal hole 100' and for preventing the bus bar 15 from becoming unfastened from the terminal 13 of the battery cell C due to the elastic piece 131 or the height of the first plate 151.

Referring to FIGS. 3 and 4, the bus bars 15 (electrically connecting the plurality of battery cells C) may be assembled to or coupled with the holder 100 at the terminal holes 100'. The bus bars 15 may each include the coupling portions 15c on opposite sides or ends thereof, coupled to the holder 100 at the adjacent terminal holes 100', and a central bent portion 15b for elastically connecting the coupling portion 15c. The bus bars 15 may be coupled to the holder 100 at two adjacent terminal holes 100' through the coupling portion 15c to connect the terminals 13 of the adjacent battery cells C. In an implementation, one bus bar 15 may be coupled to the holder 100 for every two adjacent terminal holes 100'.

The bus bars 15 coupled to the holder 100 at the terminal holes 100' may be supported by the elastic piece 131 and the assembly piece 132 around the terminal holes 100' and may maintain a regular position. In an implementation, the bent portion 15b of the bus bar 15 may extend to detour (e.g., extending over a top of) the elastic piece 131 while surrounding the elastic piece 131, and positional movement of the bus bars 15 in the first direction Z1 may be restricted by the elastic piece 131. In an implementation, the elastic piece 131 may face the bent portion 15b along the first direction Z1 and may maintain a regular position of the bus bar 15 along the first direction Z1 while forming physical interference with the bent portion 15b along the first direction Z1. The bent portion 15b of the bus bar 15 may connect the coupling portions 15c at opposite sides thereof while detouring (e.g., extending around or overtop of) the elastic piece 131.

The coupling portions 15c of the bus bar 15 may be stopped or held in place by the assembly piece 132 arranged above the coupling portions 15c so as not to leave the terminal holes 100', thereby restricting positional movement of the bus bar 15 in the heightwise or vertical third direction Z3 (away from the terminal holes 100'). In an implementation, the assembly piece 132 may function as a stopping protrusion or latch that stops deviation (e.g., fixes a position) of the bus bar 15 while facing the coupling portions 15c of the bus bar 15 in the third direction Z3. The third direction Z3 may intersect with the first direction Z1, and may be, e.g., perpendicular to the first direction Z1.

The bus bar 15 may include a bottom surface 15L on a side of or facing the battery cell C and a top surface 15U opposite to the bottom surface 15L. The assembly piece 132 may support or contact the top surface 15U of the bus bar 15 and the elastic piece 131 may support or contact the bottom surface 15L of the bus bar 15. Referring to FIG. 4, the assembly piece 132 may support the side of the top surface 15U of the bus bar 15, e.g., as one end portion of the assembly piece 132 in the third direction Z3 is arranged to face the top surface 15U of the bus bar 15, one end portion of the assembly piece 132 in the third direction Z3 and the top surface 15U of the bus bar 15 may be adjacent to each other to form physical interference therebetween, and may not mean that, e.g., the assembly piece 132 and the bus bar 15 maintain physical contact with each other. In an implementation, one end portion of the assembly piece 132 and the top surface 15U of the bus bar 15 may be separated from each other with a gap therebetween in adjacent positions in the third direction Z3, and one end portion of the assembly piece 132 may be in a position that is adjacent to the bus bar 15 to form physical interference with the bus bar 15, thereby preventing deviation of the bus bar 15 in the third direction Z3.

In an implementation, the elastic piece 131 may support the side of the bottom surface 15L of the bus bar 15, which may refer to one end portion of the elastic piece 131 (along the first direction Z1) facing the bottom surface 15L of the bus bar 15, one end portion of the elastic piece 131 along the first direction Z1 and the bottom surface 15L of the bus bar 15 may be arranged adjacent to each other to form physical interference therebetween, and may not necessarily mean that the elastic piece 131 and the bus bar 15 maintain physical contact with each other. In an implementation, one end portion of the elastic piece 131 and the bottom surface 15L of the bus bar 15 may be arranged separated from each other with a gap therebetween in adjacent positions along the first direction Z1, and one end portion of the elastic piece 131 may be arranged in a position that is adjacent to the bus bar 15 to form physical interference with the bus bar 15, thereby preventing movement of the bus bar 15 along the first direction Z1.

In an implementation, the assembly piece 132 and the elastic piece 131 may support the top surface 15U and the bottom surface 15L on opposite sides of the bus bar 15, and may face the top surface 15U and the bottom surface 15L on the opposite sides of the bus bar 15. In an implementation, the assembly piece 132 may support the coupling portions 15c at opposite ends of the bus bar 15 along the first direction Z1, and the elastic piece 131 may support the bent portion 15b at the center of the bus bar 15. The bus bar 15 assembled in the regular position by the assembly piece 132 and the elastic piece 131 may be coupled with the terminal 13 of the battery cell C exposed through the terminal hole 100', e.g., by welding.

Referring to FIG. 4, the elastic piece 131 and the assembly piece 132 may be respectively formed on the first plate 151 and the second plate 152 that are arranged alternately along the first direction Z1. The elastic piece 131 may include a first elastic piece 131a and a second elastic piece 131b that are bent from the first plate 151 of a pair in opposite directions of the first direction Z1, e.g., in a direction and a direction opposite thereto along the first direction Z1. In this case, the first elastic piece 131a and the second elastic piece 131b may be formed in pair in a position opposite to the gap g between the first plates 151 while extending from the first plate 151 to be bent in opposite directions along the first direction Z1, and may face the bent portion 15b of the bus bar 15 (which extends around the first elastic piece 131a and the second elastic piece 131b while surrounding the first elastic piece 131a and the second elastic piece 131b). In an implementation, the first elastic piece 131a may face the bent portion 15b of the bus bar 15 while being bent in the first direction Z1, and the second elastic piece 131b may face the bent portion 15b of the bus bar 15 while being bent in the opposite direction of the first direction Z1. As the first elastic piece 131a and the second elastic piece 131b are bent in the first direction Z1 and the opposite direction of the first direction Z1, they may face opposite sides of the bent portion 15b.

The elastic piece 131 may support the bent portion 15b along the first direction Z1, and may maintain the regular position of the bus bar 15 along the first direction Z1 while facing the bent portion 15b along the first direction Z1. In an implementation, the elastic piece 131 may be bent in a rounded, curved manner toward the bent portion 15b, and the elastic piece 131 may allow positional movement of the bus bar 15 through flexible deformation. In an implementation, the positional movement of the bus bar 15 may be forced by the assembly error of the bus bar 15 along the first direction Z1 or swelling of the battery cell C, in which the elastic piece 131 may allow positional movement of the bus bar 15 as the elastic piece 131 is flexibly deformed. If the elastic piece 131 were to completely prevent positional movement of the bus bar 15, stress could be concentrated between the elastic piece 131 maintaining the regular position and the bus bar 15 making positional movement, resulting in damage to the holder 100 including the elastic piece 131 or a crack in a welded portion between the bus bar 15 and the terminal 13 of the battery cell C.

Referring to FIG. 5, the elastic piece 131 may be formed locally in the center of the first plate 151 in the second direction Z2, e.g., widthwise direction of the first plate 151, which intersects with the first direction Z1. In an implementation, a width W1a of the elastic piece 131 may be narrower than a width W1b of the first plate 151, as measured in the second direction. Herein, the second direction Z2 may mean a direction that intersects with the first direction Z1, and may be, e.g., perpendicular to the first direction Z1. The elastic piece 131 may be narrower than the first plate 151 in the second direction Z2, and the elastic piece 131 may face only a part of the bus bar 15 (e.g., the bent portion 15b) without entirely facing the bus bar 15 (e.g., the bent portion 15) in the second direction Z2. In an implementation, the elastic piece 131 may maintain elastic contact with (e.g., a central region of) the bent portion 15b, and may be deformed while allowing positional movement of the bus bar 15 in a state of maintaining the elastic contact. In this case, the elastic piece 131 may contact and face only a part of the bus bar 15 to be flexibly deformed adaptively to positional movement of the bus bar 15. If the elastic piece 131 were to be excessively wide, the elastic piece 131 could be more rigid than needed and may not be deformed flexibly. In an implementation, the bent portion 15b of the bus bar 15 may face the elastic piece 131 through a part thereof and may face first side portions 151b on opposite sides of the elastic piece 131 through another part thereof.

Throughout the specification, when the elastic piece 131 is described as facing the bus bar 15, it may not mean that the elastic piece 131 contacts the bus bar 15. Depending on a positional movement state of the bus bar 15, the elastic piece 131 may face the bus bar 15 without contacting the bus bar 15, or according to a positional movement direction of the bus bar 15, the elastic piece 131 may face the bus bar 15 with the first elastic piece 131a of the elastic piece 131 contacting the bus bar 15 and without the second elastic piece 131b contacting the bus bar 15.

Referring to FIG. 5, the first plate 151 having the elastic piece 131 therein may include a first center portion 151a (from which the elastic piece 131 extends) and first side portions 151b on both sides of the first center portion 151a, in the second direction Z2, e.g., widthwise direction of the first plate 151. The elastic piece 131 may extend from the first center portion 151a, and a height h1a (in the third direction Z3) of the first center portion 151a may be less than a height h1b (in the third direction Z3) of the first side portion 151b, based on the height of the elastic piece 131. In an implementation, the elastic piece 131 may face the bent portion 15b of the bus bar 15 along the first direction Z1, and may maintain the regular position of the bus bar 15 along the first direction Z1, and may not form interference with the bus bar 15 in the third direction Z3. The bus bar 15 may be supported by the coupling portions 15c at both sides, instead of by the bent portion 15b in the third direction Z3, and may be supported above the terminal 13 of the battery cell C exposed through the terminal hole 100', and the height of the elastic piece 131 may be restricted to an appropriate value or less such that the bus bar 15 settles above the terminal 13 of the battery cell C and may not become unfastened from the terminal 13 of the battery cell C due to the height of the elastic piece 131. In an implementation, the height h1a of the first center portion 151a (from which the elastic piece 131 extends) may be less than the height h1b of the first side portion 151b. In an implementation, even if the height h1b of the first side portion 151b were to be relatively high, the first side portion 151b may be low enough so as not to cause physical interference with the bent portion 15b of the bus bar 15, and the bus bar 15 may be low enough so as not to become unfastened from the terminal 13 of the battery cell C by the height h1b of the first side portion 151b. As will be described below, the height h1b of the first side portion 151b may be less than the height h2b (see FIG. 6) of the second side portion 152b.

Referring to FIG. 5, a cutting groove V1 may be between the elastic piece 131 and the first side portion 151b. The cutting groove V1 may separate the elastic piece 131 and the first side portion 151b from each other to facilitate relative deformation therebetween, thereby inducing flexible deformation of the elastic piece 131. The cutting groove V1 may be formed to a sufficient depth relative to the height h1b of the first side portion 151b. As the depth of the cutting groove V1 increases, flexible deformation of the elastic piece 131 may be possible, the structural rigidity of the elastic piece 131 may degrade correspondingly, and the elastic piece 131 may be vulnerable to shock or vibration, such that the depth of the cutting groove V1 may be formed within an appropriate range.

Referring to FIG. 4, the assembly piece 132 may be in a position that alternates with the elastic piece 131 along the first direction Z1. The assembly piece 132 may extend from the second plate 152 of a pair in opposite directions of the first direction Z1, e.g., in a direction and a direction opposite thereto along the first direction Z1, and may be bent in the third direction Z3, and the assembly piece 132 may face the coupling portion 15c of the bus bar 15. In an implementation, the assembly piece 132 may extend from the second plate 152 in roughly reversed U shape, may be formed in pair in a position opposite to the gap g between the second plates 152, and may face the coupling portions 15c of different bus bars 15. In an implementation, the assembly piece 132 may prevent deviation of the bus bar 15 in the third direction Z3 while facing the coupling portion 15c in the third direction Z3. The assembly piece 132 may be bent in a rounded, curved shape in an entry direction of the bus bar 15, entry of the bus bar 15 to be assembled toward the terminal hole 100' may be facilitated. In an implementation, to assemble the bus bar 15 to the terminal hole 100', the assembly piece 132 may be pushed and enter toward the terminal hole 100', and as the assembly piece 132 is formed in a rounded bent shape, the assembly piece 132 may be flexibly bent without disturbing entry of the bus bar 15, thereby facilitating assembly of the bus bar 15. If entry of the bus bar 15 were not smoothly performed and excessive deformation of the assembly piece 132 is forced, deformation of the assembly piece 132 may fall beyond an elastic range, and even after entry of the bus bar 15 is completed and is assembled to the terminal hole 100', the elasticity of the assembly piece 132 may not be restored, such that the assembly piece 132 may not be restored to a position on the bus bar 15, and in this case, could lose a function of a stopper for stopping deviation of the bus bar 15.

In an implementation, as shown in FIG. 4, a pair of adjacent assembly pieces 132 with the gap g therebetween may face different bus bars 15, respectively. In an implementation, the pair of assembly pieces 132 in adjacent positions may face the coupling portions 15c at edges of the different bus bars 15. For reference, a pair of adjacent elastic pieces 131 with the gap g therebetween may face the same bus bar 15. In an implementation, the bent portion 15b of the bus bar 15 may surround a pair of elastic pieces 131 that are adjacent to each other with the gap g therebetween, in which the pair of the adjacent elastic pieces 131 may face the same bus bar 15.

Referring to FIG. 6, the elastic piece 132 may be formed locally in the center of the second plate 152 in the second direction Z2, e.g., widthwise direction of the second plate 152. In an implementation, a width W2a (in the second direction Z2) of the assembly piece 132 may be narrower than a width W2b (in the second direction Z2) of the second plate 152. The assembly piece 132 may face only a (e.g., central) part of the bus bar 15 (e.g., the coupling portion 15c) without entirely facing the bus bar 15 (e.g., the coupling portion 15c) in the second direction Z2. In an implementation, the assembly piece 132 may be flexibly bent so as to not disturb or prevent entry or coupling of the bus bar 15 when the bus bar 15 is assembled to the terminal hole 100', thus accommodating entry of the bus bar 15, and in this case, to facilitate the assembly piece 132 to be flexibly bent adaptively to entry of the bus bar 15, and the assembly piece 132 may be narrower than the second plate 152. The assembly piece 132 may be deformed within an elastic range, such that after entry or insertion of the bus bar 15 is completed and is assembled to the terminal hole 100', the assembly piece 132 may be arranged to face the bus bar 15 according to an elastic restoring force. If the assembly piece 132 were to be formed excessively wide, the assembly piece 132 could have higher rigidity than needed and may not be deformed flexibly. In this case, excessive deformation of the assembly piece 132 could be forced upon entry of the bus bar 15, and even after completion of entry of the bus bar 15, the assembly piece 132 may not be elastically restored and may lose the stopper function thereof.

Referring to FIGS. 5 and 6, the width W2a of the assembly piece 132 may be narrower than the width W1a of the elastic piece 131. In an implementation, the width W1a of the elastic piece 131 may be relatively wide. As described below, positional movement of the bus bar 15 caused by swelling of the battery cell C may be accumulatively made according to a position in the first direction Z1, such that by forming the elastic piece 131 relatively wide, for which much deformation corresponding to the accumulative positional movement of the bus bar 15 is forced, physical damage to the elastic piece 131 may be prevented.

Referring to FIG. 4, the elastic piece 132 may face the bus bar 15, and may not necessarily contact the bus bar 15. Depending on a detailed design, the assembly piece 132 may face the bus bar 15 without contacting the bus bar 15, and may stop deviation of the bus bar 15 in a position facing the bus bar 15 in the third direction Z3. In an implementation, when the bus bar 15 enters toward or is inserted into the terminal hole 100', the assembly piece 132 may bend toward an outer position of the bus bar 15 along the first direction Z1 so as not to disturb insertion of the bus bar 15; and after completion of insertion of the bus bar 15, the assembly piece 132 may be restored toward an inner position of the bus bar 15 along the first direction Z1 to face the (e.g., top surface of the) bus bar 15.

Referring to FIG. 6, the second plate 152 having the assembly piece 132 therein may include a second center portion 152a from which the elastic piece 132 extends, and second side portions 152b on both sides of the second center portion 152a, in the second direction Z2. The assembly piece 132 may extend from the second center portion 152a, and a height h2a (in the third direction Z3) of the second center portion 152a may be less than a height h2b (in the second direction) of the second side portion 152b, based on the height of the assembly piece 132. In an implementation, even when the height of the assembly piece 132 is low, the bus bar 15 may be prevented from becoming unfastened from the terminal 13 of the battery cell C, depending on the height of the assembly piece 132, and the height of the assembly piece 132 may be higher than the height of the elastic piece 131. In an implementation, if the height of the assembly piece 132 were to be excessively high, the total height of the battery pack could increase and thus may be regulated to an appropriate height, and to this end, the height h2a of the second center portion 152a from which the assembly piece 132 extends may be less than the height h2b of the second side portion 152b. The height h2b of the second side portion 152b may not cause the bus bar 15 to be unfastened from the terminal 13 of the battery cell C, and thus may be higher than the height h1b (see FIG. 5) of the first side portion 151b.

A cutting groove V2 may be between the assembly piece 132 and the second side portion 152b. The cutting groove V2 may separate the elastic piece 132 and the second side portion 152b from each other to facilitate relative deformation therebetween, thereby inducing flexible deformation of the assembly piece 132. In an implementation, insertion of the bus bar 15 toward the terminal hole 100' may not be disturbed through flexible deformation of the assembly piece 132. The cutting groove V2 may be formed to a sufficient depth relative to the height h2b of the second side portion 152b, and as the depth of the cutting groove V2 increases, flexible deformation of the assembly piece 132 may be possible, but as the structural rigidity of the assembly piece 132 may degrade correspondingly, the assembly piece 132 becomes vulnerable to shock or vibration, and the depth of the cutting groove V2 may be formed within an appropriate range.

FIG. 7 shows a modified embodiment of the holder of FIG. 2, showing a modified structure of a plate. As shown in FIG. 2, the gap g between the plates 150 may be an appropriate size along the first direction Z1. As shown in FIG. 7, the gap g between the plates 150 may be a variable size along the first direction Z1. The size of the gap g may mean a gap between the plates 150 that are paired along the first direction Z1. The gap g between the plates 150 may help absorb positional movement of the bus bar 15 and may help block propagation of stress caused by the positional movement of the bus bar 15. The positional movement of the bus bar 15 may be caused by swelling of the battery cell C, and the amount of positional movement of the bus bar 15 caused by swelling of the battery cell C may be accumulative with respect to a position in the first direction Z1. In an implementation, with respect to a reference line L that divides the battery cells C into the same number along the first direction Z1, the amount of positional movement of the bus bar 15 caused by swelling of the battery cell C may be accumulative according to a relative position or distance from the reference line L. In an implementation, the size of the gap g between the plates 150 may increase along the first direction Z1 in proportion to the amount of accumulative positional movement of the bus bar 15, and the size of the gap g may increase in a direction from a position relatively close or proximate to the reference line L to a position relatively far from or distal to the reference line L. In an implementation, a size of a gap g may increase with increasing distance to the reference line L, e.g., a gap g proximate to the reference line L may be narrower than a gap g distal to the reference line L. In an implementation, the size of the gap g between the plates 150 may increase, e.g., in a direction from a center position to an edge position on the holder 110 along the first direction Z1, rather than according to a distance from the reference line L that divides the battery cells C into the same number.

FIG. 8 shows another modified embodiment of the holder of FIG. 2, showing another modified structure of a plate. As shown in FIG. 8, the plate 150 may include the first plate 151 and the second plate 152 that are arranged in an alternating order along the first direction Z1. In this case, a first gap g1 between the first plates 151 may change with a position in the first direction Z1 (e.g., may change based on a distance from the reference line L), and a second gap g2 between the second plates 152 may be maintained constant, e.g., with respect to or independent from the relative position thereof in the first direction Z1. In the first plate 151, the elastic piece 131 that is forced to be deformed may be formed to allow positional movement of the bus bar 15 in the first direction Z1. In this case, the first gap g1 between the first plates 151 having the elastic piece 131 formed therein may increase or decrease in size according to the distance from the reference line L, e.g., to help absorb the amount of positional movement of the bus bar 15 that is accumulative according to the position in the first direction Z1. In an implementation, with respect to the reference line L that divides the battery cells C into the same number along the first direction Z1, the size of the first gap g1 may increase in a direction from the position relatively close to the reference line L to the position relatively far from the reference line L, based on the distance from the reference line L. In an implementation, the size of the first gap g1 may increase in a direction from a center position to an edge position along the first direction Z1 on the holder 120, rather than based on the reference line L.

The assembly piece 132 for stopping deviation of the bus bar 15 may be formed in the second plate 152 in the third direction Z3, and the second gap g2 between the second plates 152 having the assembly piece 132 formed therein may provide a clearance for absorbing bending of the assembly piece 132 so as not to disturb entry of the bus bar 15. In this case, bending of the assembly piece 132 may not be accumulative according to the position in the first direction Z1, such that the size of the second gap g2 may be constant regardless of the position. In an implementation, the size of the second gap g2 may be maintained constant in a direction from the center position to the edge position along the first direction Z1 on the holder 120.

According to embodiments, by forming the support structure of the bus bar as a flexibly deformable structure, positional movement of the bus bar may be allowed in a situation where the positional movement of the bus bar is forced by the assembly error of the bus bar or swelling of the battery cell. Consequently, the battery pack may be provided which is capable of preventing accumulation of stress between the bus bar or the terminal of the battery cell bound with the bus bar and the support structure of the bus bar and improving durability.

One or more embodiments may provide a battery pack in which accumulation of stress accompanied by an assembly error of a bus bar or swelling of a battery cell may be prevented and durability may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged along a first direction;
a holder, the holder including:
terminal holes exposing terminals of the battery cells, and
pairs of first plates separated from each other between adjacent terminal holes and pairs of elastic pieces that are bent from the pairs of first plates in opposite directions along the first direction; and
bus bars, each of the bus bars including:
coupling portions at opposite sides thereof and coupled to adjacent terminal holes, and
a central bent portion connecting the coupling portions and extending around corresponding pairs of elastic pieces to surround the corresponding pairs of elastic pieces.

2. The battery pack as claimed in claim 1, wherein the pairs of elastic pieces are bent to face the bent portion of a corresponding bus bar along the first direction.

3. The battery pack as claimed in claim 1, wherein the pairs of elastic pieces have a rounded curved shape.

4. The battery pack as claimed in claim 1, wherein the pairs of elastic pieces each include:
a first elastic piece bent toward one side of the bent portion of a corresponding bus bar along the first direction, and
a second elastic piece bent in a direction opposite to the first elastic piece and toward another side of the bent portion of the corresponding bus bar.

5. The battery pack as claimed in claim 1, wherein the pairs of elastic pieces are at center positions of the pairs of first plates in a widthwise direction of the pairs of first plates, the widthwise direction of the pairs of first plates being a second direction intersecting with the first direction.

6. The battery pack as claimed in claim 1, wherein:
the pairs of first plates each include a first center portion from which the pairs of elastic pieces extend and first side portions on opposite sides of the first center portion, in a widthwise direction of the pairs of first plates, the widthwise direction of the pairs of first plates being a second direction intersecting with the first direction, and
a height of the first center portion is less than a height of each first side portion.

7. The battery pack as claimed in claim 6, wherein the pairs of first plates each include a cutting groove between the pairs of elastic pieces and the first side portions.

8. The battery pack as claimed in claim 1, further comprising pairs of second plates between adjacent terminal holes and arranged in an alternating order with the pairs of first plates,
wherein:
the pairs of first plates have a first gap therebetween in the first direction, and
the pairs of second plates have a second gap therebetween in the first direction.

9. The battery pack as claimed in claim 8, wherein the pairs of first plates have a height that is different from a height of the pairs of second plates, as measured in a vertical third direction that intersects with the first direction.

10. The battery pack as claimed in claim 8, further comprising pairs of assembly pieces on the pairs of second plates,
wherein the pairs of elastic pieces are on the pairs of first plates.

11. The battery pack as claimed in claim 10, wherein:
the pairs of elastic pieces are on the pairs of first plates in positions that are opposite to a first gap between the pairs of first plates, and
the pairs of assembly pieces are on the pairs of second plates in positions that are opposite to a second gap between the second plates.

12. The battery pack as claimed in claim 11, wherein:
the pairs of elastic pieces face a bent portion of a same bus bar, and
the pairs of assembly pieces face coupling portions of different bus bars.

13. The battery pack as claimed in claim 10, wherein:
the pairs of elastic pieces face the bent portion of a corresponding bus bar along the first direction, and
the pairs of assembly pieces face the coupling portions of corresponding bus bars in a vertical third direction that intersects with the first direction.

14. The battery pack as claimed in claim 10, wherein the pairs of assembly pieces extend from the pairs of second plates in opposite directions along the first direction and are bent in a vertical third direction that intersects with the first direction to face the coupling portions of corresponding bus bars.

15. The battery pack as claimed in claim 10, wherein the pairs of assembly pieces are at center positions of the pairs of second plates in a widthwise direction of the pairs of second plates, the widthwise direction of the pairs of second plates being a second direction intersecting with the first direction.

16. The battery pack as claimed in claim 10, wherein:
the pairs of second plates each include a second center portion from which the pairs of assembly pieces extend and second side portions on opposite sides of the second center portion, in a widthwise direction of the second plates, the widthwise direction of the pairs of second plates being a second direction intersecting with the first direction, and a height of the second center portion is less than a height of each of the second side portions.

17. The battery pack as claimed in claim 16, wherein the pairs of second plates include a cutting groove between the pairs of assembly pieces and the second side portion.

18. The battery pack as claimed in claim 8, wherein sizes of the first gaps and the second gaps vary according to a relative position thereof along the first direction.

19. The battery pack as claimed in claim 18, wherein sizes of the first gaps and the second gaps increase with increasing distance from a center position of the holder to an edge position of the holder along the first direction.

20. The battery pack as claimed in claim 8, wherein:

sizes of the first gaps vary according to a relative position thereof along the first direction, and sizes of the second gaps are constant.

* * * * *